C. E. MILLER.
PROCESS OF MAKING TIRES.
APPLICATION FILED MAY 4, 1914.
1,128,480. Patented Feb. 16, 1915.
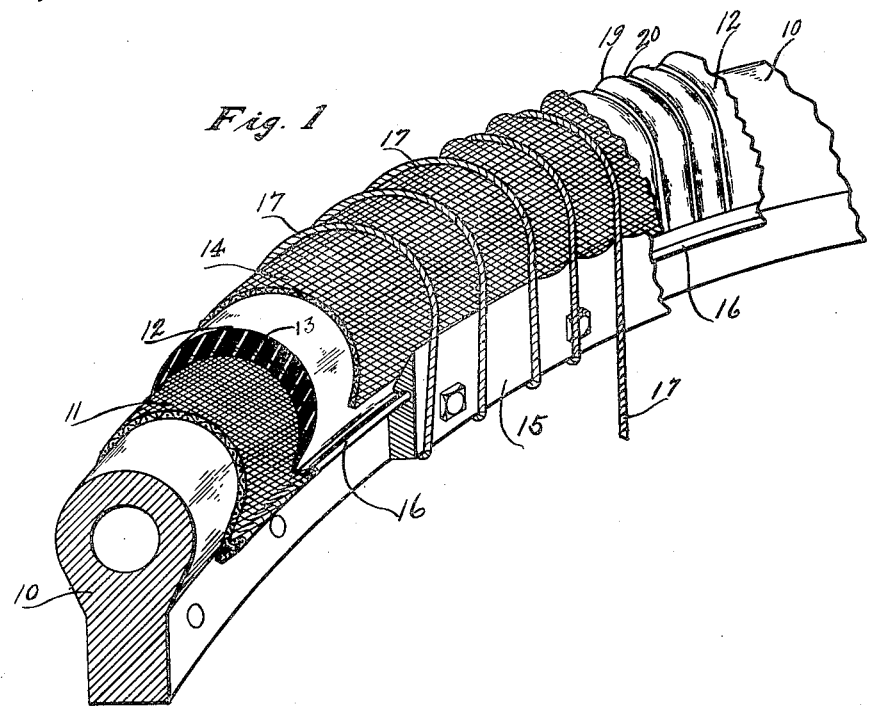
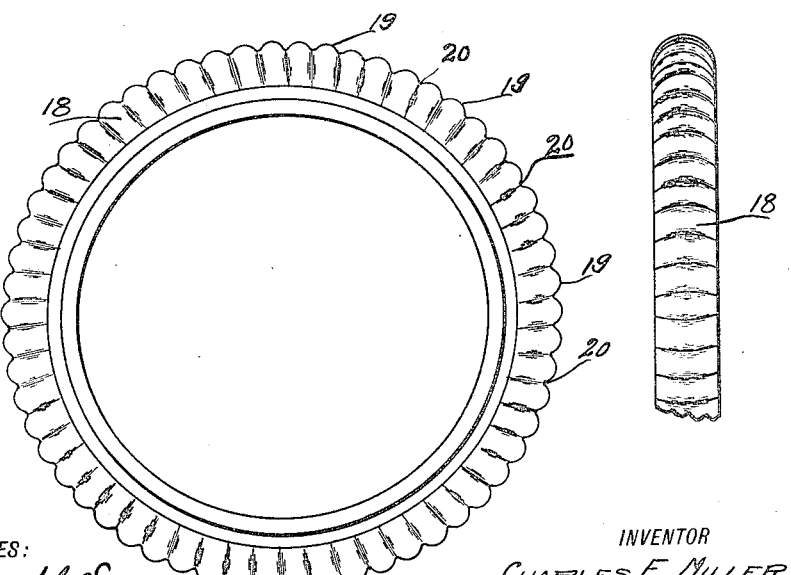
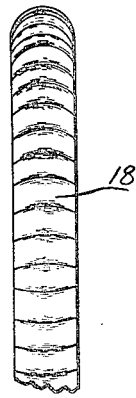
WITNESSES:
Yost Braddock
Josephine Gasper
INVENTOR
CHARLES E. MILLER.
BY
Hood & Schley
ATTORNEYS

UNITED STATES PATENT OFFICE.

CHARLES E. MILLER, OF ANDERSON, INDIANA.

PROCESS OF MAKING TIRES.

1,128,480.          Specification of Letters Patent.     Patented Feb. 16, 1915.

Application filed May 4, 1914. Serial No. 836,091.

*To all whom it may concern:*

Be it known that I, CHARLES E. MILLER, a citizen of the United States, residing at Anderson, in the county of Madison and State of Indiana, have invented a new and useful Process of Making Tires, of which the following is a specification.

In the manufacture of non-skid tires, it has heretofore ordinarily been necessary to use a rather complex process, including the vulcanizing of the tire two or three times at different stages of the process.

It is the object of my invention to simplify in various ways the process of making non-skid tires, to reduce the number of vulcanizations required to one, and to provide a tire with an improved non-skid tread.

The accompanying drawing illustrates my improved tire and the process of making it.

Figure 1 is a sectional perspective view of a tire, showing the various steps in my process of making it; and Figs. 2 and 3 are side and edge elevations respectively, of a complete tire made by my process.

In making my tire, there is applied to the usual iron forming core 10, of suitable shape, any desired number of layers of fabric 11 which are to form the base on which the tire is built, the edges of this fabric usually being cemented to the iron core to hold them in place during the building up of the tire. Then the rubber 12 which is to form the body of the tire is applied over the fabric 11, this rubber layer 12 usually being thicker at the tread than at the sides, and made up of different kinds of rubber, such as "cushion" stock and "tread" stock, for different parts of the tire. If desired, one or more layers of fabric 13, such as the breaker strip for protecting the subjacent rubber from stone bruises, may be embedded in this layer of rubber. Over the rubber layer 12 a jacket cloth 14, of strong fabric, is laid, this jacket cloth preferably being cut on the bias as I have found that this permits it to conform more readily to the shape of the tire. The jacket cloth 14 extends inward along the sides of the tire sufficiently far to be gripped by the outer edges of the bead plates 15, which are now clamped in place to hold the various layers tightly against one another and the core 10, to provide the beads 16, and usually to put on whatever lettering is desired on the sides of the tire.

Spaced bindings 17 are now put on over the jacket cloth 14. Preferably these bindings are of contractile material, so that they will press down into the jacket cloth 14 and rubber 12 when subjected to steam or other moisture. The most effective binding material I now know of is ordinary rope, which is conveniently put on in one continuous wrapping, with successive convolutions properly spaced, by a suitable wrapping machine, the wrapping extending around the core 10 and bead plates 15 as well as over the jacket cloth 14.

The whole structure is now put into a vulcanizer and the rubber vulcanized, a steam vulcanizer giving excellent results. During this vulcanizing process the rubber expands, and bulges out between the spaced bindings 17 and conforms itself to the shape of the bindings beneath them, all in a smooth wave curve. This bulging is accentuated by the contraction which takes place in the bindings themselves if they are of contractile material, such as rope, for rope contracts markedly when wetted, as it is during the vulcanizing process; and is also somewhat increased by the expansion of the iron core 10 under the heat of vulcanization.

When the vulcanizing is completed the tire and its associated parts are removed from the vulcanizer. The bindings 17, the bead plates 15, and the jacket cloth 14 are now taken off, and the completed tire 18 is removed from the core 10. This tire, which is shown in Figs. 2 and 3, has a cog-like tread which extends well down along its sides, and is composed of crests or ribs 19 and troughs 20, interconnected by a smooth wavy curve. The tops of the ribs 19 are in the form of circular arcs. This cog-like tread is very efficient in preventing slipping and skidding of the wheels, and yet by my process is manufactured very inexpensively.

I claim as my invention:

1. The process of making tires, which consists in forming the tire on a core, covering it with a jacket cloth cut on the bias, applying spaced bindings of contractile material over the jacket cloth, and vulcanizing to cure the tire and cause it to bulge between the bindings and the bindings to contract.

2. The process of making tires, which consists in forming the tire on a core, covering it with a jacket cloth, applying spaced bindings of contractile material over the jacket cloth, and vulcanizing to cure the tire and cause it to bulge between the bindings and the bindings to contract.

3. The process of making tires, which consists in forming the tire on a core, covering it with a jacket cloth cut on the bias, applying spaced bindings over the jacket cloth, and vulcanizing to cure the tire and cause it to bulge between the bindings.

4. The process of making tires, which consists in forming the tire on a core, covering it with a jacket cloth, applying spaced bindings over the jacket cloth, and vulcanizing to cure the tire and cause it to bulge between the bindings.

5. The process of making tires, which consists in forming the tire on a core, covering it with a jacket cloth, applying over the jacket cloth a winding of rope having its successive convolutions spaced apart, and vulcanizing to cure the tire and cause it to bulge between the bindings and the bindings to contract.

6. The process of making tires, which consists in forming the tire on a core, covering it with a jacket cloth, applying over the jacket cloth a winding of manila rope, and vulcanizing to cure the tire and cause it to bulge between the bindings and the bindings to contract.

In witness whereof, I, have hereunto set my hand at Indianapolis, Indiana, this first day of May, A. D. one thousand nine hundred and fourteen.

CHARLES E. MILLER.

Witnesses:
 LOUISE BENNETT,
 G. B. SCHLEY.